US011383962B2

(12) United States Patent
Lohmann et al.

(10) Patent No.: US 11,383,962 B2
(45) Date of Patent: Jul. 12, 2022

(54) INDUSTRIAL TRUCK WITH STAND-ON PLATFORM

(71) Applicant: Jungheinrich Aktiengesellschaft, Hamburg (DE)

(72) Inventors: Helmut Lohmann, Gyhum (DE); Michael Schueler, Schoenberg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 362 days.

(21) Appl. No.: 16/751,302

(22) Filed: Jan. 24, 2020

(65) Prior Publication Data
US 2020/0239291 A1 Jul. 30, 2020

(30) Foreign Application Priority Data

Jan. 25, 2019 (DE) .................... 10 2019 101 862.5

(51) Int. Cl.
*B66F 9/075* (2006.01)
*B62D 33/06* (2006.01)
*B62D 51/00* (2006.01)
*B62D 51/02* (2006.01)

(52) U.S. Cl.
CPC ........ *B66F 9/0759* (2013.01); *B62D 33/0604* (2013.01); *B62D 51/02* (2013.01); *B62D 51/001* (2013.01)

(58) Field of Classification Search
CPC ........ B62K 7/04; B62B 5/087; B62D 51/001; B62D 33/0604; B62D 51/02; B66F 9/0759
See application file for complete search history.

(56) References Cited

U.S. PATENT DOCUMENTS

| 9,889,894 | B2 | 2/2018 | Lohmann |
| 11,178,812 | B1* | 11/2021 | Crowl ................. B62D 51/02 |
| 2016/0244109 | A1* | 8/2016 | Lohmann ........... B62D 51/005 |
| 2016/0244110 | A1* | 8/2016 | Lohmann ........... B62D 51/005 |
| 2019/0100255 | A1* | 4/2019 | Benevelli ........... B60G 99/002 |
| 2020/0346509 | A1* | 11/2020 | Kiefer ................ F16F 15/02 |

(Continued)

FOREIGN PATENT DOCUMENTS

| CN | 108946582 A | * 12/2018 | ......... B66F 9/07568 |
| CN | 112978615 A | * 6/2021 | |
| DE | 60117956 T2 | 11/2006 | |

(Continued)

*Primary Examiner* — Paul N Dickson
*Assistant Examiner* — Maxwell L Meshaka
(74) *Attorney, Agent, or Firm* — Barclay Damon LLP (57) ABSTRACT

An industrial truck extends along a longitudinal truck axis and comprises a drive section and a stand-on platform positioned on the drive section. The stand-on platform comprises a base element configured to pivot about a first pivot axis and a stand-on element mounted to the base element and configured to pivot about a second pivot axis. The first pivot axis is parallel to the second pivot axis and offset from the second pivot axis by an offset distance in a direction of a longitudinal truck axis, and the stand-on element is configured to extend above the base element to form a standing surface. A first suspension is configured to support the base element and a second suspension is configured to support the stand-on element. The first suspension is positioned at a distance from the second suspension in the direction of the longitudinal truck axis.

17 Claims, 5 Drawing Sheets

(56) References Cited

U.S. PATENT DOCUMENTS

2020/0352098 A1* 11/2020 Fujii ...................... A01D 34/82
2021/0331768 A1* 10/2021 Rudofsky ............ B62D 55/108

FOREIGN PATENT DOCUMENTS

| DE | 102009042318 A1 * | 3/2011 | ............ B62D 51/02 |
| DE | 102013111832 A1 * | 4/2015 | ........... B66F 9/0759 |
| DE | 202015107017 U1 * | 3/2016 | .............. B62D 3/06 |
| DE | 102015102584 A1 | 8/2016 | |
| EP | 485257 A1 | 5/1992 | |
| EP | 1172285 A2 * | 1/2002 | .............. B62B 3/06 |
| EP | 1172285 B1 | 3/2006 | |
| EP | 2336009 A1 * | 6/2011 | ............ B62B 5/087 |
| EP | 2360083 A1 * | 8/2011 | ............ B62D 51/02 |
| JP | 2002128485 A | 5/2002 | |

* cited by examiner

INDUSTRIAL TRUCK WITH STAND-ON PLATFORM

CROSS REFERENCE TO RELATED INVENTION

This application is based upon and claims priority to, under relevant sections of 35 U.S.C. § 119, German Patent Application No. 10 2019 101 862.5, filed Jan. 25, 2019, the entire contents of which are hereby incorporated by reference.

BACKGROUND

This application is directed to an industrial truck with a drive section and a stand-on platform arranged on the drive section for an operator, the stand-on platform having a base element which can be pivoted about a first pivot axis fixed to the vehicle and a stand-on element mounted on the base element so as to be pivotable about a second pivot axis. The first pivot axis and the second pivot axis run parallel to one another and are offset to one another by an offset distance in a direction along a longitudinal axis of the vehicle or truck. The stand-on element, extending above the base element, forms the standing surface for the operator, wherein the base element is supported on the industrial truck via a first suspension during its pivoting movement about the first pivot axis.

Industrial trucks with standing platforms for an operator, i.e. for a driver of the industrial truck, the operator travels along with the industrial truck standing on the platform. The operator steers the industrial truck via one or more operating elements, which are arranged in particular at a drawbar head. Standing platforms for such industrial trucks are usually designed with suspension to increase driving comfort. In this way, shocks acting on the industrial truck during travel are transmitted to the operator in a damped manner. There are various known solutions for suspending such stand-on platforms.

DE 10 2015 111 178 A1, for example, refers to a stand-on platform which is mounted to a suspension arrangement supported on a frame of the industrial truck via a lever arm mounted around a pivot axis. The stand-on platform itself acts as a contrary lever arm, also around the pivot axis. An operator standing close to the pivot axis will hardly experience any spring impact, whereas at a relatively large distance from the pivot axis the spring effect is unpleasantly high.

From DE 10 2006 009 331 A1 a stand-on platform is known with an upper base plate hinged to a lower base plate, with a suspension element arranged between the base plates. With this arrangement a strong spring effect is only given near the spring, whereas with increasing distance from the spring the spring effect decreases strongly.

EP 1 205 427 A1 describes an industrial truck with an elastically supported stand-on platform with spring elements and guide means designed separately from the spring elements, the guide means being in contact with the vehicle frame and with the stand-on platform via cross struts. This construction is very costly to manufacture and maintain.

From DE 10 2013 111 832 A1 a rectangular floor plate used as a stand-on platform is disclosed, which has a spring element at each of its corners. On such a stand-on platform, an operator will experience a very unsteady standing position and therefore will have significant balance problems.

The aforementioned stand-on platforms are, for example, disclosed in DE 10 2015 102 583 A1. Herein, a base element is mounted on a vehicle frame so that it can be pivoted about a first pivot axis and connected to a stand-on element for an operator via a second pivot axis. A suspension extends between the vehicle frame and the stand-on element and thus supports both the stand-on element and the base element coupled to it against movements about their pivot axes. In addition, the stand-on element features a vertical section with a guide wheel that rolls along a guide fixed to the vehicle when a weight force is applied to the stand-on platform. This construction is very complex. A comparable stand-on platform is known from DE 10 2015 102 584 A1, which features an additional, a switchable damping unit acting between the vehicle frame and the stand-on platform. This stand-on platform has the same disadvantages.

Based on the discussed state of the art, the underlying task of the invention is to provide an industrial truck with a stand-on platform which, in a simple constructional manner, allows uniform suspension over the entire area of the stand-on platform.

BRIEF SUMMARY OF THE INVENTION

In an embodiment, an industrial truck features a stand-on element supported by a second suspension during its pivoting movement about the second pivot axis and the first suspension is arranged along the longitudinal axis of the truck at a distance from the first pivot axis.

In addition to the drive part, the industrial truck may also comprise a load part, whereby the load part may in particular comprise a lift mast and/or load forks. The drive part may in particular have a drive, for example an electric motor and batteries supplying the electric motor with power. The industrial truck can be a forklift truck, for example, in particular a high-lift or a low-lift truck. The stand-on platform comprises the stand-on element and the base element and is thus constructed in two parts. The stand-on element extends above the base element in at least one position of use of the stand-on platform and forms the standing surface for the operator. The base element can be pivoted about the first pivot axis fixed to the vehicle and is supported by the first suspension to the vehicle, for example to a vehicle frame, in particular a drive frame of the drive part. The term pivot axis fixed to the vehicle refers to a pivot axis fixed to an industrial truck. The terms vehicle and industrial truck are used synonymously in this context. The stand-on element can be pivoted about the second pivot axis independently of the base element.

In an embodiment, a second suspension, separate from the first, is provided to support the stand-on element. The suspensions support the base element and the stand element independently of each other. Thus, the first suspension supports the base element, for example in relation to an underbody of the vehicle. The second suspension supports the base element independently of the first suspension, for example also relative to a vehicle underbody or relative to the base element. The first suspension and the second suspension are not identical and may, for example, be realized by different suspension elements. The first suspension and the second suspension may be offset from each other, particularly along the longitudinal axis of the vehicle, as will be explained below. In addition, according to the invention, the first suspension is spaced along the longitudinal axis of the vehicle from the first pivot axis. The first suspension is therefore not located at the same longitudinal position in relation to the longitudinal axis of the vehicle as the first pivot axis. For example, the first pivot axis may be located at a first end of the base element and the first suspension may be located at a second end of the base element opposite the first end along the longitudinal axis of the vehicle. The second suspension may also be located along the longitudinal axis of the vehicle at a distance from the second pivot axis.

Such a stand-on platform is structurally simple; in particular, a vertical section with a guide wheel as is provided for the stand-on platform of DE 10 2015 102 583 A1 explained above can be omitted in a structurally simple manner. With the stand-on platform described there, the vertical section compensates for one-sided lever forces, which arise in particular due to the only one-sided suspension. In contrast, in the invention, such lever forces are compensated in particular by moving the first suspension away from the first pivot axis and by bracing the pivoting movement about the second pivot axis via a second suspension. This is not only less complex in terms of design but also in terms of maintenance. In addition, the stand-on platform according to the invention provides a very even suspension over its entire surface.

According to an embodiment, the first suspension and the second suspension are offset from each other along the longitudinal axis of the vehicle. This offsetting allows the suspensions to support, i.e. damp the movements about the respective pivot axes especially well. In particular, the lever forces of the levers formed by the base element and the stand-on element can be easily absorbed by the design.

According to an embodiment, the first pivot axis is located at a first end of the base element and the first suspension at a second end of the base element opposite the first end along the longitudinal axis of the vehicle, between the base element and an underbody of the industrial truck extending below the base element. In this manner, the spacing of the first suspension from the first pivot axis along the longitudinal axis of the vehicle according to the invention can be readily realized. The first suspension is arranged in particular at the second end of the base element in such a way that the lever forces exerted by the base element during its movement about the first pivot axis are optimally damped. The second suspension can be offset from the first suspension along the longitudinal axis of the vehicle. In particular, the second pivot axis can be located at a first end of the stand-on element and the second suspension can be located at a second end of the stand-on element opposite the first end along the longitudinal axis of the vehicle. In this way, the lever forces of the stand-on element during its movement about the second pivot axis can also be compensated. The support of the stand-on element via the second suspension can be provided directly via the base element or via the industrial truck, as will be explained later.

According to an embodiment, the first suspension is located on a lever arm extending from the base element and extending along the longitudinal axis of the vehicle from the two pivot axes. The lever arm may extend in particular towards a load part of the industrial truck. The base element can form a kind of rocker with the lever arm, which is mounted so as to pivot about the first pivot axis. The entire stand-on platform can thus be mounted on the industrial truck in a lever-like manner. According to this aspect, the first suspension can be arranged between one end of the base element and an underbody of the industrial truck via the lever arm extending away from the base element instead of or in addition to the arrangement explained above, whereby the lever arm can engage in particular at the end of the base element at which the first pivot axis is arranged. Thus the base element and thus in particular the entire standing platform can also be supported on the industrial truck via an end extending away from the second pivot axis in the direction of the load part. For example, the first suspension can be connected to a drive frame of the industrial truck. The base element may be suspended from the drive frame via the first suspension. In this way, the distance of the first suspension from the first pivot axis along the longitudinal axis of the vehicle can also be easily achieved. In this case, the previously described support in relation to an underbody can be omitted, whereby the stand-on platform in accordance with the invention can also be designed so that it can be folded in and out.

According to an embodiment, the second suspension is arranged in such a way that the spring force exerted by the second suspension is greatest in the region of the first pivot axis and/or the first suspension is arranged in such a way that the spring force exerted by the first suspension is greatest in the region of the second pivot axis. As explained at the beginning, it is often precisely in the area of the respective pivot axis that the springing effect which dampens the movement about this pivot axis is weakest, whereas the damping effect increases with increasing distance from the respective pivot axis due to the lengthening lever arm. According to an embodiment, the first suspension and/or the second suspension are arranged in such a way that this disadvantage is compensated. This can be achieved in particular by the above-mentioned arrangements of the first suspension and/or the second suspension. For example, this can be achieved by arranging the second suspension in the area of the first pivot axis and/or by arranging the first suspension in the area of the second pivot axis.

According to an embodiment, the second suspension is located in the area of the first pivot axis and/or the first suspension is located in the area of the second pivot axis. As a result, the stand-on element can be directly supported on the base element or also on the industrial truck in the area of the first pivot axis during its pivoting movement about the second pivot axis, as already mentioned above. Thus, due to the second suspension, a sufficiently high spring resilience can also be achieved in the area of the first pivot axis—where the first suspension usually hardly exerts any spring effect—or due to the first suspension also in the area of the second pivot axes—where the second suspension usually hardly exerts any spring resilience. The spatial proximity to the respective pivot axis, i.e. the positioning of the respective suspension in spatial proximity to the respective other pivot axis, is defined in the area of the respective pivot axis. In particular, the spatial proximity can be selected in such a way that the spring effect exerted by the first suspension is greatest in the area of the second pivot axis or that the spring effect exerted by the second suspension is greatest in the area of the first pivot axis.

According to an embodiment, the first pivot axis runs along a first end of the base element connected to the industrial truck and the second pivot axis runs along a second end of the base element opposite the first end on the longitudinal axis of the truck. The second end may in particular be a free end of the base element. The two pivot axes can thus extend along opposite ends of the base element. In addition, the second pivot axis can run along a first end of the base element, which can be opposite a second, in particular free end of the base element.

According to an embodiment, the stand-on element is supported via the second suspension on the base element and/or on the industrial truck during its pivoting movement about the second pivot axis. As previously mentioned, the stand-on element can be directly supported on the industrial truck. The second suspension can then be arranged between the stand-on element and the industrial truck, in particular between one end of the stand-on element and a drive frame of the industrial truck. However, the second suspension can also support the pivoting movement of the stand-on element about the second pivot axis on the base element and in particular not directly on the industrial truck. The second suspension can, for example, be arranged between the stand-on element and the base element.

The base element can in particular support the stand-on element. The stand-on element can only be attached to the industrial truck via the base element without direct contact with the industrial truck. When the stand-on element is supported on the base element in this way, both the stand-on element and the base element—i.e. ultimately the entire stand-on platform—can pivot about the first pivot axis and are supported on the industrial truck via the first suspension. In particular, the first suspension can support the base element on a vehicle frame, for example a drive frame of the drive section, as already mentioned. However, a joint support of the stand-on element and base element by means of only one suspension would not allow a uniform resilience effect over the entire surface of the stand-on platform, but would, as explained at the beginning, lead to a varying spring force depending on the distance from the suspension. This is particularly due to the fact that a lever arm acting about the first pivot axis has a different length depending on the operator's standing position on the stand-on platform. This disadvantage is compensated for by the second spring suspension, which is in accordance with the invention and which, according to the present aspect, supports the stand-on element relative to the base element. The second suspension can therefore have a strong resilience, especially at those parts of the standing platform where the first suspension can only produce a slight resilience. Accordingly, the second suspension can have a low spring resilience where the first suspension has a high spring resilience. In particular, the stand-on element can be supported on the base element via the second suspension in the area of the first pivot axis. Thus, a high degree of comfort for the operator can be achieved for a stand-on platform with two pivot axes.

According to an embodiment, the base element has two support brackets and a transverse boom connecting the support brackets. The second suspension is located between the transverse boom and the stand-on element. The stand-on element can therefore be supported in particular by the transverse boom of the base element. Such a construction is particularly simple and yet stable.

According to an embodiment, the stand-on platform is constructed to be adjustable about the first pivot axis between an extended position of use, in which the stand-on element extends substantially horizontally, and a folded stowed position on the industrial truck, in which the stand-on element extends substantially vertically. The stand-on platform can therefore be configured to be folded in or folded out. When the industrial truck is not in use, the stand-on platform can be folded in, in particular folded up, and thus stowed against the industrial truck. When the industrial truck is used, the stand-on platform can be folded out of the stowed position into the use position, in particular folded down, and used by an operator. The stand-on element is preferably supported on the base element and, when the base element moves around the first pivot axis, the stand-on element also moves with it. Consequently, the entire stand-on platform is moved between the stowage position and the use position. In particular, the stand-on platform can be moved about a pivot direction about the first pivot axis, which is opposite to the pivot movement about the first pivot axis, in which the first suspension supports the base element relative to the vehicle. The stand-on platform can thus be stowed away in a practical manner.

According to one specification, the first suspension and the second suspension have different spring forces. As different suspensions are envisaged, it is also possible to provide different spring forces for the different suspensions. The spring forces of the suspensions can differ in such a way that the uniform spring effect described above can be achieved over the entire area of the standing platform. For example, the spring force provided for a suspension may depend on the point at which the respective suspension acts on the base element or the stand-on element. Lever arms of different lengths can therefore be taken into account.

According to an embodiment, the first spring and/or the second spring comprises one or more spring elements from the following set: steel spring, coil spring, plate spring, elastomer spring, rubber spring. The coil spring may be made of steel; the elastomer spring may be a polyurethane spring, for example.

According to another embodiment, the industrial truck comprises a fastening mechanism which secures the stand-on element to the base element, in particular in a detachable manner. The fastening mechanism has at least two mutually corresponding fastening means, wherein a first fastening means can be arranged on the stand-on element and a second fastening means on the base element. The fastening mechanism can comprise as a fastening means, for example, a bolt engaging in a bolt receptacle or a screw engaging in a receptacle, which can be held on the receptacle, in particular by a nut. According to this configuration, the spring effect of the second suspension can be adjusted via the fastening mechanism. Such adjustability may be achieved, for example, by varying the compression of the second suspension, in particular by varying the distance between the stand-on element and the base element. For this purpose, for example, a screw can be tightened further.

BRIEF DESCRIPTION OF THE DRAWINGS

Aspects of the invention are detailed below by means of figures. The figures show.

Unless otherwise indicated, in the following, identical reference signs denote identical objects.

DETAILED DESCRIPTION OF THE INVENTION

Figure 1:
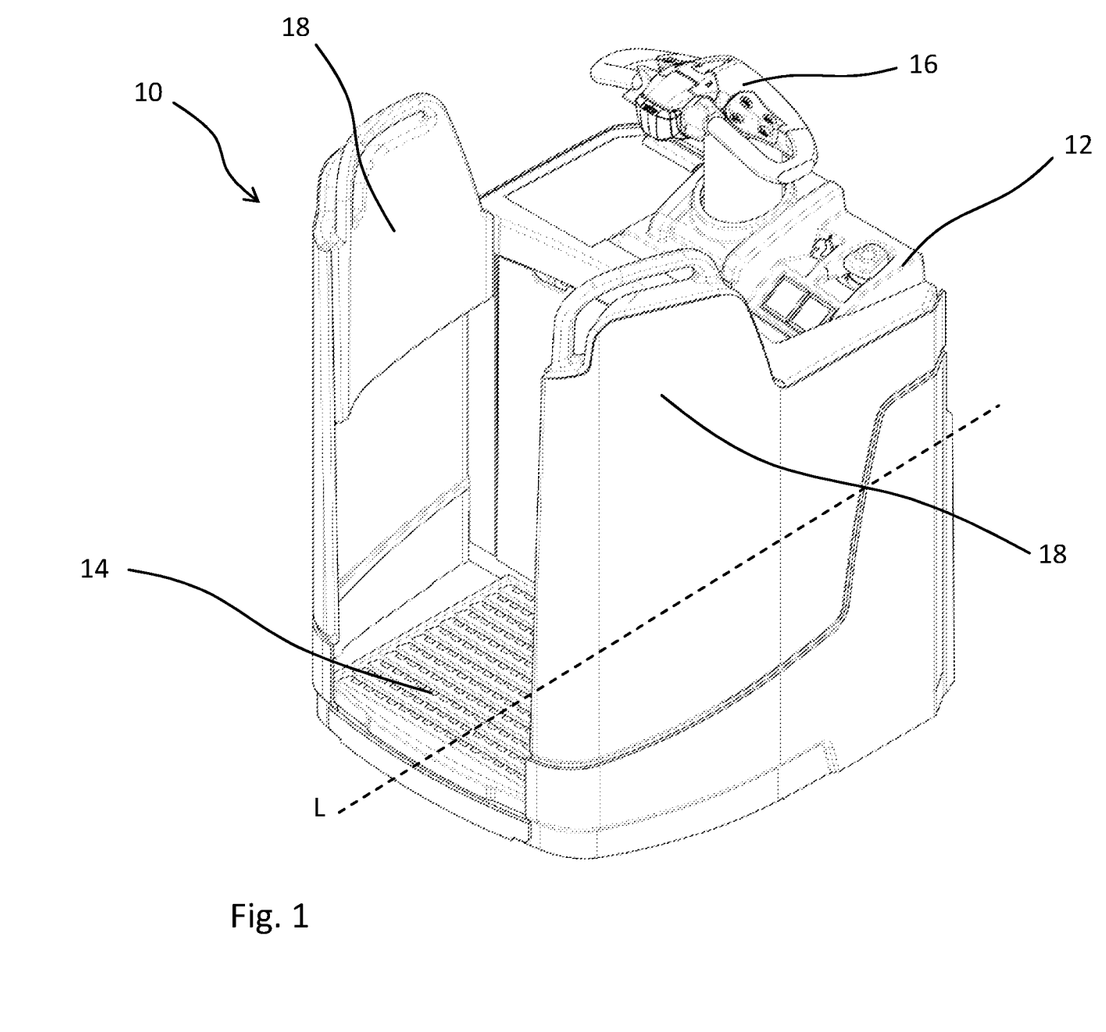
FIG. 1 illustrates perspective view of an embodiment of an industrial truck.

FIG. 1 shows an industrial truck 10 according to the invention with a drive section 12 and a stand-on platform 14.

The drive section 12 has a drawbar head 16 with operating elements for controlling the industrial truck by an operator standing on the stand-on platform 14. The stand-on platform 14 is partially framed by lateral support struts 18, which provide support for an operator standing on the stand-on platform, in particular when driving around bends. A load section may be provided at the front of the industrial truck 10 adjacent to the drive section 12, on the side of the drive section 12 opposite the stand-on platform 14. Such a load unit, not shown, is used to move loads by means of the industrial truck 10.

Figure 2:
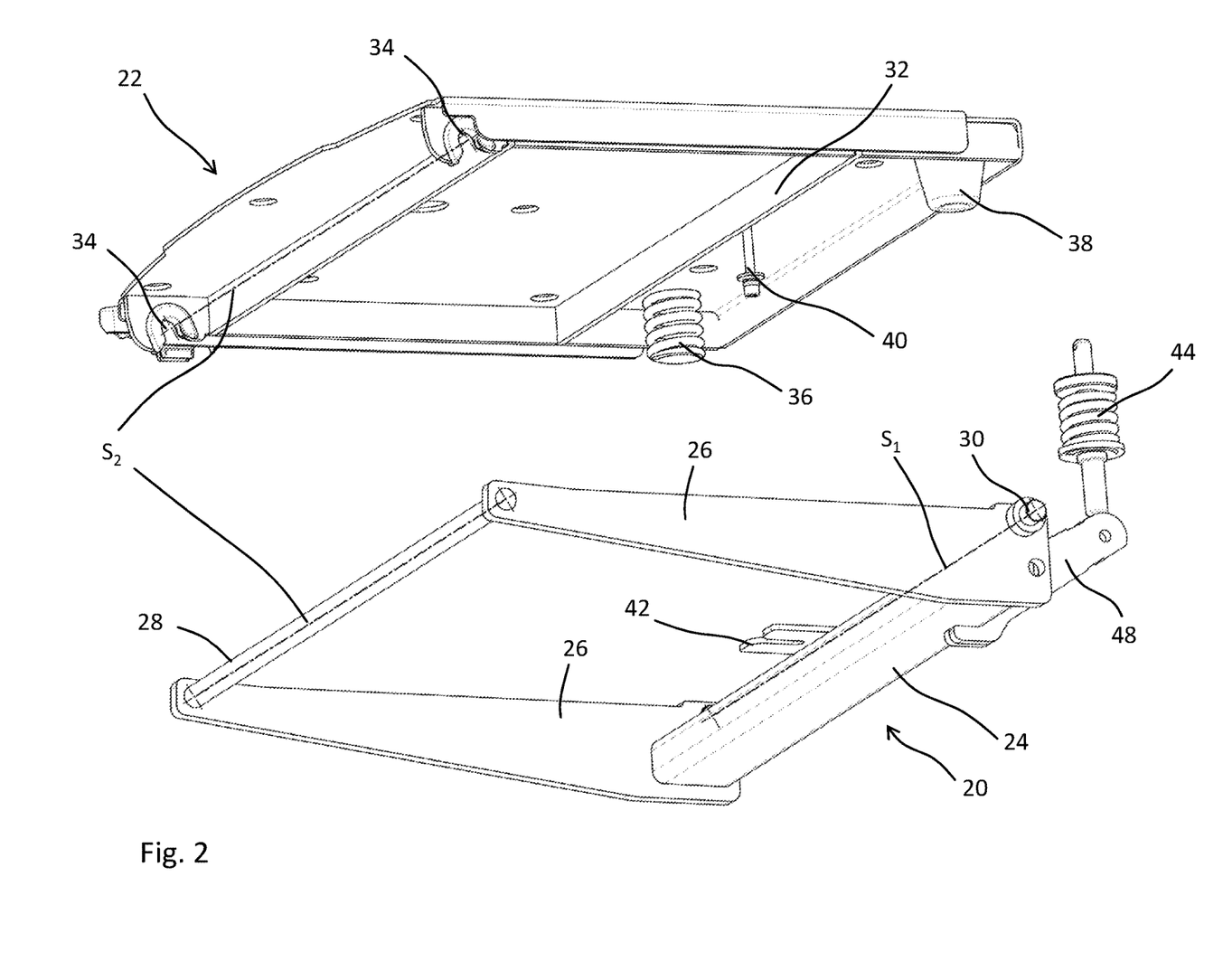
FIG. 2 illustrates a bottom perspective view of an embodiment of a stand-on platform of the industrial truck with a separate stand-on element and base element.

An exploded view of the stand-on platform 14 in FIG. 2 shows that the stand-on platform has a two-part design. The stand-on platform 14 comprises a base element 20 and a stand-on element 22. The base element 20 comprises a transverse boom 24 which connects two parallel support brackets 26 to each other at a first of their ends. At the opposite ends of the support brackets 26, a bearing rod 28 extends between the support brackets. The base element 20 is pivotally mounted on the drive frame of the industrial truck 10 in a manner not shown in the illustration by means of bearing pins 30 arranged at the first end of the support brackets 26. The bearing pins 30 extending from the outer sides of the opposite support brackets 26 can be accommodated in correspondingly designed bearing seats in the drive frame. The base element 20 is thus firmly mounted on the industrial truck so that it can be pivoted about a first pivot axis S1, which extends through the opposite bearing pins 30.

The stand-on element 22 has a flat design and, in the present example, has reinforcement struts 32 running along its underside. Bearings 34, formed at a first end of the stand-on element 22, accommodate the bearing rod 28 of the stand-on element when it is connected to the base element 20. The stand-on element 22 is thus mounted on the base element 20 so that it can be pivoted about a second pivot axis S2, which extends through the opposing bearings 34 and the bearing rod 28. At a second end of the base element 22 opposite the first end, a second suspension is arranged, which comprises two suspension elements, of which a first suspension element 36 is configured as a coil spring and a second suspension element 38 is configured as a rubber spring. Of course, both suspension elements are usually configured as coil springs or rubber springs or otherwise. Via the suspension elements 36, 38, the stand-on element 22 is supported by the transverse boom 24 of the base element 20, as shown in detail in FIG. 3.

Figure 3:
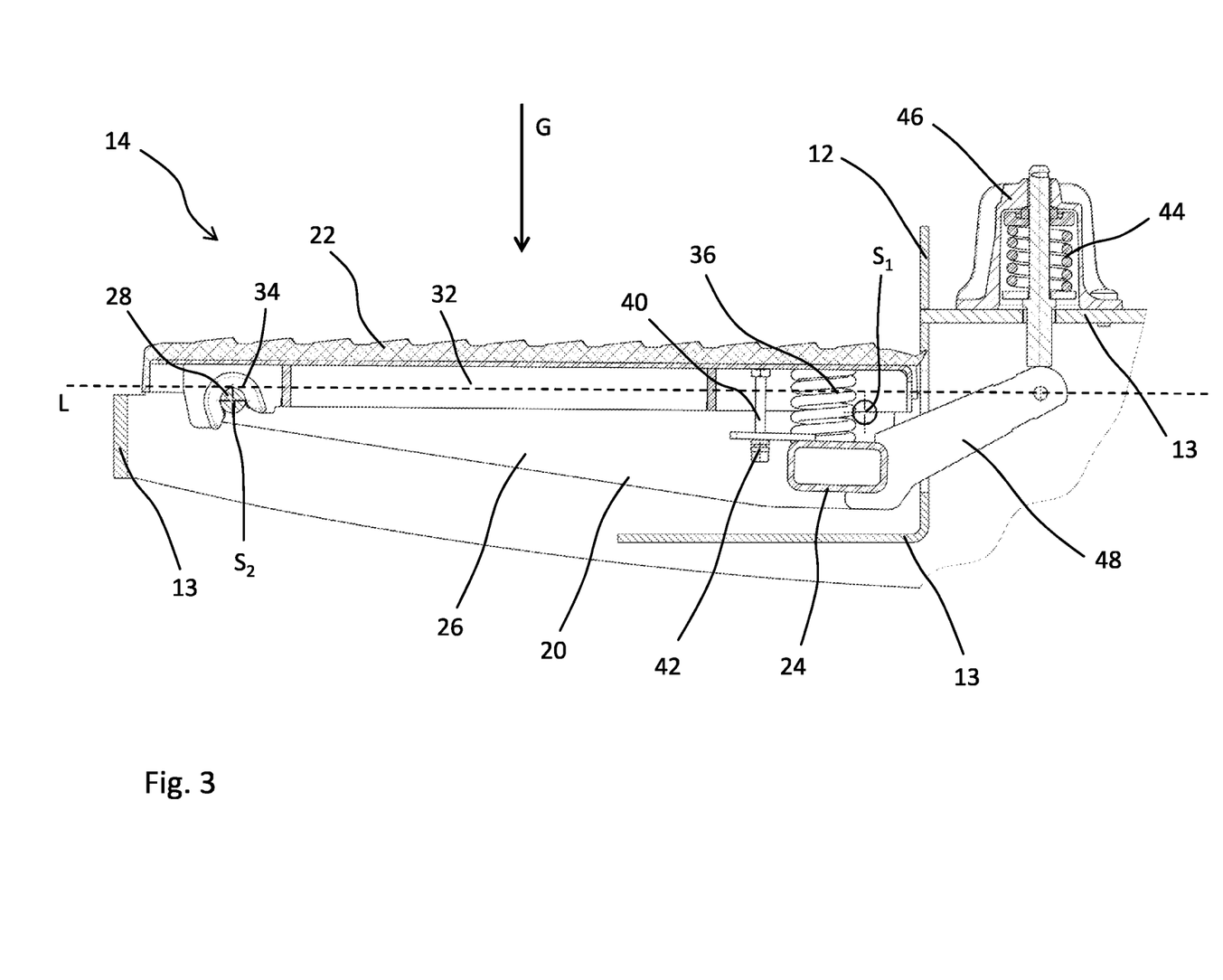
FIG. 3 illustrates a cross sectional view of the embodiment of the standing platform shown in FIG. 2 with the stand-on element and base element connected together.

FIG. 3 shows a sectional view of the two-part stand-on platform in the connected state of base element 20 and stand-on element 22, whereby the bearing rod 28 is accommodated in the bearing receptacles 34 and the suspension elements 36 and the suspension element 38, which is not visible in FIG. 3, come into contact with the transverse boom 24. In order to prevent the stand-on element 22 from disengaging from the base element 20, a fastening mechanism is provided comprising a screw 40 extending from the stand-on element 22 towards the base element 20 and a screw receptacle 42 arranged on the base element 20. In the connected state of the stand-on element 22 and the base element 20, the screw 40 engages the screw receptacle 42 and can be fastened with a nut from the side of the screw receptacle 42 facing away from the stand-on element 22. In this way the base element 20 holds the base element 22 securely and releasably. In addition, the hardness of the second suspension can be adjusted via the fixing mechanism. As the nut is increasingly screwed onto the screw 40, the stand-on element 22 is pulled closer to the base element 20 and thus the suspension elements 36, 38 of the second suspension are compressed more. FIG. 3 also shows that the base element 20 is supported by a first suspension 44 on a drive frame 13 of the truck. The first suspension 44, in this case comprising a coil spring, is arranged for this purpose in a bell 46 connected to the vehicle frame 13. The first suspension 44 is arranged along a vehicle longitudinal axis L at a distance from the first pivot axis $S_1$. The pivot axes $S_1$, $S_2$ are also spaced apart along the vehicle longitudinal axis L.

If the stand-on platform 14 is now loaded with weight, e.g. by an operator climbing onto the stand-on platform, a gravitational force acts on the stand-on platform 14 along the arrow line marked G in FIG. 3. This causes the entire stand-on platform 14, i.e. both the stand-on element 22 and the base element 20, to pivot about the first pivot axis $S_1$. This movement is braced by the first suspension 44. In this way the first suspension element 44 is compressed by a lever arm 48 extending from the first pivot axis S1 into the drive part. In addition, the stand-on element 22 is also pivoted about the second pivot axis S2, compressing the second suspension 36, 38. This results in a two-fold suspension of the operator. The respective suspensions can compensate the disadvantages of the other suspension. The first suspension 36, 38 is located in the area of the first pivot axis S1, and the stand-on element 22 is thus subjected to a large spring effect in the area of the first pivot axis S1 via the second suspension 36, 38. Especially in the area of the first pivot axis, the spring effect of the first suspension 44 is particularly low due to a low leverage effect. In the area of the second pivot axis S2, the spring effect of the first suspension 44 is large due to a very large lever acting in relation to the first pivot axis S1 and the spring effect of the second suspension 36, 38 is small due to the large distance to this suspension. If the spring effect of the second suspension 36, 38 decreases more and more in one direction from the drive part 12, i.e. from right to left in FIG. 3, the spring effect of the first suspension 44 increases more and more. The second suspension is thus arranged in such a way that the spring force exerted by the second suspension is greatest in the area of the first pivot axis and the first suspension is arranged in such a way that the spring force exerted by the first suspension is greatest in the area of the second pivot axis.

The spacing of the first suspension 44 and the first pivot axis S1 from each other along the longitudinal axis L via the lever arm 48 permits a structurally simple suspension of the base element 20 and thus of the entire standing platform 14 on the drive frame 13. The standing platform according to the invention thus permits a uniform suspension over the entire standing platform in a structurally simple manner, especially without the necessity of a vertical section with a guide wheel rolling on the drive frame.

Figure 4:
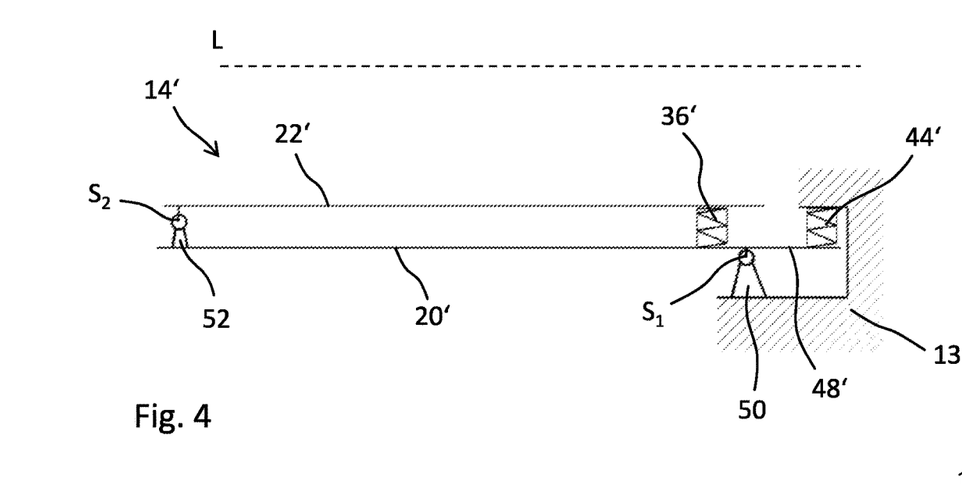
FIG. 4 illustrates a schematic depiction of an embodiment of the stand-on platform in a position of use.

FIG. 4 shows a purely schematic view of a further configuration of a stand-on platform in accordance with the invention, which essentially corresponds to the design explained above. Thus, this stand-on platform 14' also comprises a base element 20' and a stand-on element 22' extending above the base element. The base element 20' can be pivoted via a first support 50 about a first pivot axis S1 which is fixed to the vehicle. The support 50 is firmly connected to the drive frame 13. During the pivoting movement about the first pivot axis S1, the base element 20' is supported on the drive frame 13 via a first suspension 44', a lever arm 48' of the base element 20' engaging the first suspension 44'. Here, too, the base element 20' supports the standing element 22', so that the latter and thus the entire standing platform 14' are also supported on the vehicle frame 13 via the first suspension 44' during their joint movement about the first pivot axis S1. In addition, the stand-on element 22' is mounted so that it can pivot about the second pivot axis S2 relative to the base element 20' and is supported relative to the base element 20' by the second suspension 36'. In the manner explained above, this makes it possible to achieve a spring effect that is essentially constant over the entire stand-on platform in a simple constructional manner. However, the stand-on platform 14' differs from the stand-on platform 14 explained above in that it is designed to be stowable.

Figure 5:
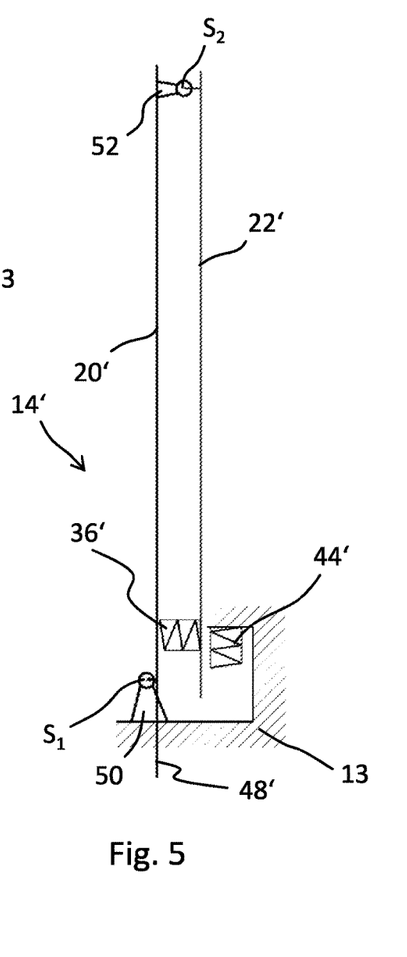
FIG. 5 illustrates a schematic depiction of the embodiment of the stand-on platform of FIG. 4 in a stowage position.

FIG. 5 shows the platform 14' from FIG. 4 in a stowage position. In this position the platform 14' is folded up by approx. 90° to the industrial truck and can thus be stowed in a space-saving manner. To use the stand-on platform 14', it can be folded down by 90° from the stowed position in FIG. 5 to the use position shown in FIG. 4. The illustration in FIG. 5 is also purely schematic. The lever arm 48' can always engage in recesses in the vehicle frame 13.

Figure 6:
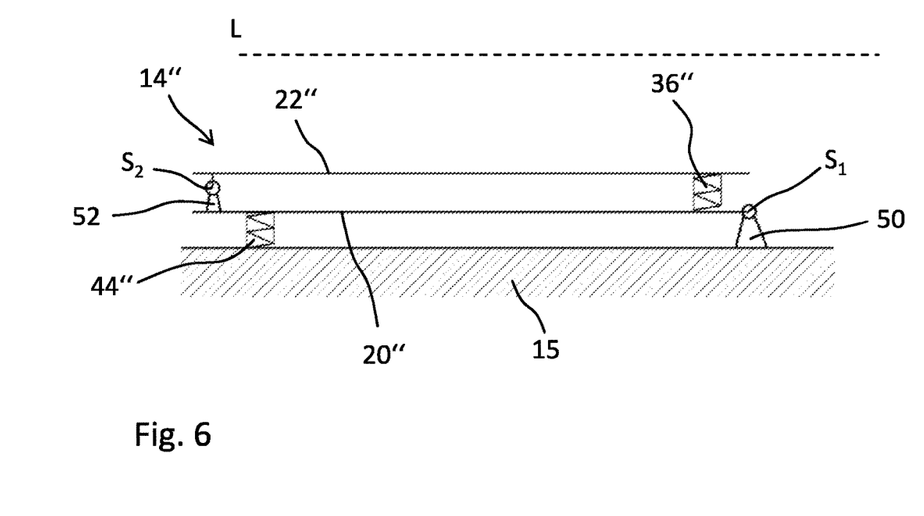
FIG. 6 illustrates a schematic depiction of an embodiment of the stand-on platform.

FIG. 6 also shows a rough schematic representation of a stand-on platform 14" with a differently arranged first suspension 44". The first suspension 44" is not arranged on a lever arm of the base element 20" extending away from the second pivot axis $S_2$, but instead at a second end of the base element 20" in the area of the second pivot axis $S_2$ between an underside of the base element 20" and an underbody 15 of the industrial truck extending below the base element. The second end of the base element 20" here designates the end opposite a first end having the first pivot axis S1. Here, too, the first suspension 44" is thus arranged along the longitudinal axis L of the vehicle at a distance from the first pivot axis S1, thus achieving the structurally simple design of the stand-on platform. Here too, the spring effect exerted by the first suspension 44" is as great as possible in the area of the second pivot axis S2. Thus, an even spring effect can be achieved over the entire stand-on platform by this design.

Figure 7:
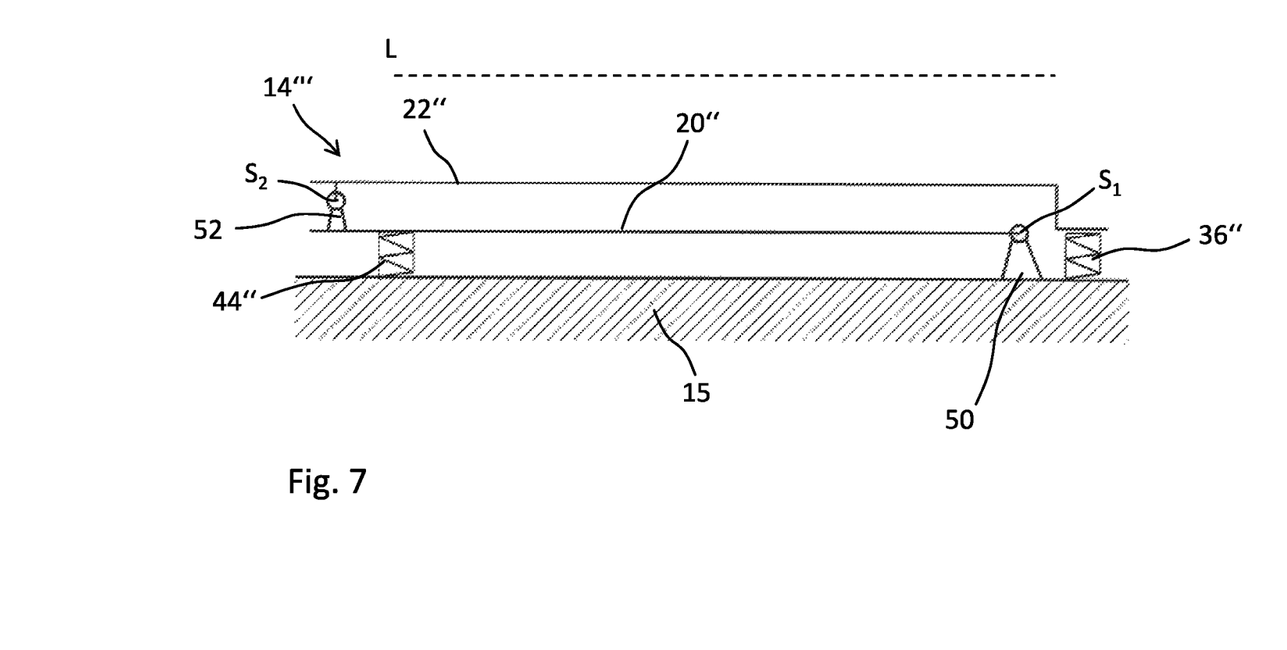
FIG. 7 illustrates a schematic depiction of another embodiment of the stand-on platform.

FIG. 7 also shows a rough schematic representation of a further design of a standing platform 14'''. The only difference between this and the stand-on platform 14" shown in FIG. 6 is that the second suspension 36" is not located between stand-on element 22" and base element 20" but between one end of stand-on element 22" and the underbody 15 of the industrial truck. The standing element 22" is thus supported during its pivoting movement about the second pivot axis $S_2$ via the second suspension 36" not on the base element (20, 20', 20") but directly on the industrial truck.

LIST OF REFERENCE NUMBERS

10 industrial truck
12 drive section
13 drive frame
14, 14', 14", 14''' stand-on platform
15 underbody
16 drawbar head
18 support struts
20, 20', 20" base element
22, 22', 22" stand-on element
24 transvers boom
26 support brackets
28 bearing rod
30 bearing pin
32 reinforcement struts
34 bearing
36, 36', 36" second suspension
38, 38', 38" second suspension
40 screw
42 screw receptacle
44, 44', 44" first suspension
46 bell
48, 48' lever arm
50 bearing
52 bearing
$S_1$ first pivot axis
$S_2$ second pivot axis

The invention claimed is:

1. An industrial truck extending along a longitudinal truck axis and comprising:
  a drive section; and
  a stand-on platform positioned on the drive section, the stand-on platform comprising,
    a base element configured to pivot about a first pivot axis,
    a stand-on element mounted to the base element and configured to pivot about a second pivot axis, wherein the first pivot axis is parallel to the second pivot axis and offset from the second pivot axis by an offset distance in a direction of the longitudinal truck axis, and wherein the stand-on element is configured to extend above the base element to form a standing surface,
    a first suspension configured to support the base element, and
    a second suspension configured to support the stand-on element, wherein the first suspension is positioned at a distance from the second suspension in the direction of the longitudinal truck axis.

2. The industrial truck according to claim 1, wherein the first pivot axis is positioned at a first end of the base element and the first suspension is positioned at a second end of the base element.

3. The industrial truck according to claim 2, wherein the first suspension is positioned between the base element and an underbody extending below the base element, and wherein the second end of the base element is located opposite the first end in the direction of the longitudinal truck axis.

4. The industrial truck according to claim 1, wherein the first suspension is positioned on a lever arm extending from the base element.

5. The industrial truck of claim 4, wherein the lever arm extends in the direction of the longitudinal truck axis.

6. The industrial truck according to claim 1, wherein at least one of:
  (i) a spring force exerted by the first suspension is greatest in a region of the second pivot axis; and
  (ii) a spring force exerted by the second suspension is greatest in a region of the first pivot axis.

7. The industrial truck according to claim 1, wherein at least one of:
  (i) the first suspension is positioned in a region of the second pivot axis; and
  (ii) the second suspension is positioned in a region of the first pivot axis.

8. The industrial truck according to claim 1, wherein the first pivot axis extends along a first end of the base element and the second pivot axis extends along a second end of the base element, and wherein the first end is coupled to the industrial truck and the second end is opposite the first end.

9. The industrial truck according to claim 1, wherein the stand-on element is supported by the second suspension during a pivot movement about the second pivot axis.

10. The industrial truck according to claim 1, wherein the base element further comprises two support brackets and a transverse boom configured to couple to the two support brackets.

11. The industrial truck according to claim 10, wherein the second suspension is positioned between the transverse boom and the stand-on element.

12. The industrial truck according to claim 1, wherein the stand-on platform is configured to be adjusted about the first pivot axis between an extended position and a stowed position, wherein in the extended position the stand-on element extends substantially horizontally, and wherein in the stowed position the stand-on element extends substantially vertically.

13. The industrial truck according to claim 6, wherein the spring force of the first suspension is different than the spring force of the second suspension.

14. The industrial truck according to claim 1, wherein the first suspension comprises at least one of a steel spring, a coil spring, a plate spring, a elastomer spring, and a rubber spring.

15. The industrial truck according to claim 1, wherein the second suspension comprises at least one of a steel spring, a coil spring, a plate spring, a elastomer spring, and a rubber spring.

16. The industrial truck according to claim 6, further comprising a fastening mechanism configured to releasably fasten the stand-on element to the base element.

17. The industrial truck according to claim 16, wherein the spring force of the second suspension is adjustable via the fastening mechanism.

* * * * *